United States Patent
Murray

(10) Patent No.: US 8,504,814 B2
(45) Date of Patent: Aug. 6, 2013

(54) RESILIENCY AGAINST FIELD-UPDATED SECURITY ELEMENTS

(75) Inventor: Mark R. Murray, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 12/824,917

(22) Filed: Jun. 28, 2010

(65) Prior Publication Data

US 2010/0332816 A1    Dec. 30, 2010

Related U.S. Application Data

(60) Provisional application No. 61/221,260, filed on Jun. 29, 2009.

(51) Int. Cl.
    *G06F 9/00*        (2006.01)

(52) U.S. Cl.
    USPC ............................................................. 713/2

(58) Field of Classification Search
    USPC ........... 713/1–2; 717/39.36, 30, 13; 714/124
    See application file for complete search history.

(56) References Cited

U.S. PATENT DOCUMENTS

| | | | | |
|---|---|---|---|---|
| 6,463,550 | B1 * | 10/2002 | Cepulis et al. | 714/25 |
| 6,691,225 | B1 * | 2/2004 | Suffin | 713/2 |
| 6,948,183 | B1 * | 9/2005 | Peterka | 725/25 |
| 6,983,362 | B1 * | 1/2006 | Kidder et al. | 713/1 |
| 7,689,872 | B2 * | 3/2010 | Doyle et al. | 714/48 |
| 7,814,368 | B2 * | 10/2010 | Hogan et al. | 714/22 |
| 2001/0049263 | A1 * | 12/2001 | Zhang | 455/67.1 |
| 2005/0055689 | A1 * | 3/2005 | Abfalter et al. | 717/174 |
| 2006/0271499 | A1 * | 11/2006 | Course | 705/67 |
| 2009/0064135 | A1 * | 3/2009 | Jimmerson | 717/178 |
| 2009/0158383 | A1 * | 6/2009 | Taskiran-Cyr | 725/132 |

\* cited by examiner

*Primary Examiner* — Kim Huynh
*Assistant Examiner* — Alyaa Mazyad
(74) *Attorney, Agent, or Firm* — Merchant & Gould

(57) ABSTRACT

User terminal resilience to application elements may be provided. Upon initialization, a user terminal may detect elements associated with the user terminal's operation. The user terminal may load each of the elements in turn and determine whether the element causes a fault in the user terminal. Elements that result in a fault may be disabled from being loaded in the future.

18 Claims, 3 Drawing Sheets

RESILIENCY AGAINST FIELD-UPDATED SECURITY ELEMENTS

RELATED APPLICATION

Under provisions of 35 U.S.C. §119(e), the Applicant claims the benefit of U.S. provisional application No. 61/221,260, filed Jun. 29, 2009, which is incorporated herein by reference.

BACKGROUND

Field-updated security element resilience may be provided. In some situations, hardware (such as a set top box for use in a cable television system) may be thoroughly tested before being deployed into the field. Such devices may be deployed in customer's homes, making access to the hardware for servicing inconvenient. New security elements, such as firmware upgrades, may be applied to the hardware while it is deployed. If an error occurs during the installation, such as corruption of the security element, or if an incompatible security element is applied to the hardware, the hardware's processor may trigger a reboot as a defense against an error condition or a possible security attack. In conventional systems, this can trigger a reboot loop that effectively disables the hardware.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
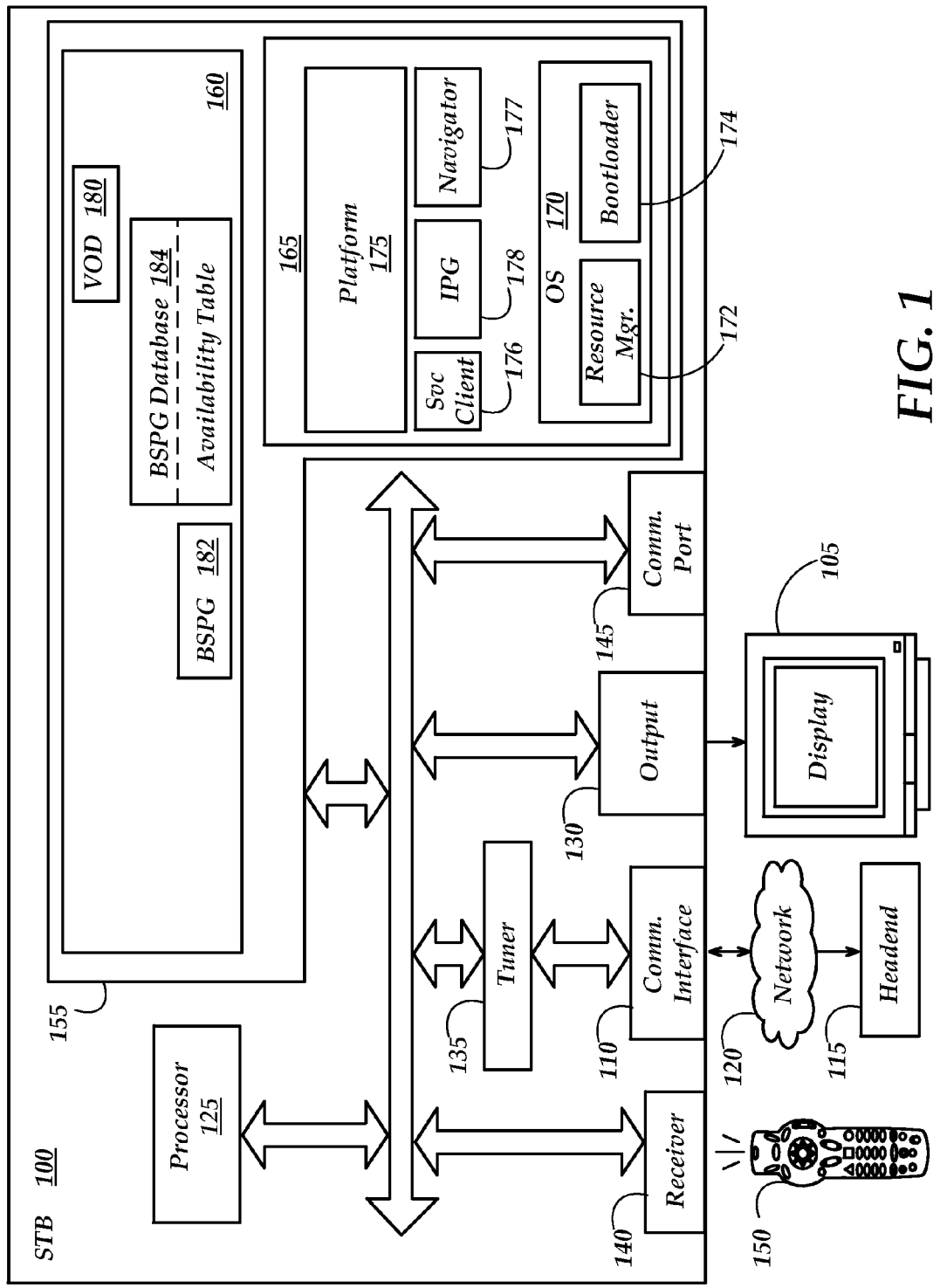
FIG. 1 is a block diagram of a cable television network.

Consistent with embodiments of the present invention, systems and methods are disclosed for field-updated security element resilience. Subscriber cable equipment, such as a set-top box (STB), may comprise a set of instructions for initializing and activating a plurality of software and/or hardware components within the STB. The instructions may determine a current state for each of the components and detect the presence of a new component. The state for a new component may be set to reflect its new status prior to being initialized. If the new component results in a fault, the STB may reboot, and the new component's status may be used by the STB in a decision to skip the new component rather than repeat the fault and reboot.

Both the foregoing general description and the following detailed description are examples and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Field-updated security element resilience may be provided. A bootloader in a set-top box (STB) may load hardware and/or software elements associated with subsystems of the STB. A checksum and state associated with each element may be tracked by the bootloader as part of a boot-up process for the STB. The checksum may be used to detect the presence of a new element and the bootloader may create and/or update the state associated with the new element to reflect its untested status. The bootloader may then initialize and/or load the new element. If a fault in the new element arises, the STB may reboot. The state associated with the new element may enable to STB to skip over the new element to avoid the fault and a resulting reboot loop.

FIG. 1 is a block diagram illustrating components of a set top box 100. STB 100 may be situated, for example, within the residence or business of a subscriber. It may be integrated into a device that has a display, such as a computing device, or it may be a stand-alone unit that couples to an external display, such as a display 105 included with a computer or a television. STB 100 may process media transported in television signals for presentation or playback to a subscriber. STB 100 may comprise a communications interface 110 for receiving the RF signals, which may include media such as video, audio, graphical and data information, from a cable system headend 115. STB 100 may communicate with headend 115 via a network 120, such as a hybrid fiber-coax (HFC) cable television distribution network or an IP network (e.g. the Internet). STB 100 may also provide any reverse information (such as admission control data as required by a subscriber that has purchased a bi-directional service) to headend 115. STB 100 may further comprise a processor 125 for controlling operations of STB 100, including a video output port such as an RF output system 130 for driving display 105, a tuner system 135 for tuning into a particular television channel to be displayed and for sending and receiving data corresponding to various types of media from the headend.

Tuner 135 may comprise an out-of-band tuner (OOB) for bi-directional quadrature phase shift keying (QPSK) data communication and a quadrature amplitude modulation (QAM) tuner for receiving television signals. The OOB coupled with an upstream transmitter may enable STB 100 to interface with the network so that STB 100 may provide upstream data to the network, for example via the QPSK or QAM channels. This allows a subscriber to interact with the network. Encryption may be added to the OOB channels to provide privacy.

Additionally, STB 100 may comprise a receiver 140 for receiving externally generated information, such as user inputs or commands for other devices. STB 100 may also include one or more wireless or wired communication interfaces, such as a communication port 145, for receiving and/or transmitting data to other devices. For instance, STB 100 may feature USB (Universal Serial Bus) (for connection to a USB camera or microphone), Ethernet (for connection to a computer), IEEE-1394 (for connection to media devices in an entertainment center), serial, and/or parallel ports. A computer or transmitter may for example, provide the user inputs with buttons or keys located either on the exterior of the terminal or by a hand-held remote control device 150 or keyboard that includes user-actuated buttons. In the case of bi-directional services, a user input device may include audiovisual information such as a camera, microphone, or videophone. As a non-limiting example, STB 100 may feature USB or IEEE-1394 for connection of an infrared wireless remote control or a wired or wireless keyboard, a camcorder with an integrated microphone or to a video camera and a separate microphone.

STB 100 may simultaneously decompress and reconstruct video, audio, graphics and textual data that may, for example, correspond to a live program service. This may permit STB 100 to store video and audio in memory in real-time, to scale down the spatial resolution of the video pictures, as necessary, and to composite and display a graphical user interface (GUI) presentation of the video with respective graphical and textual data while simultaneously playing the audio that corresponds to the video. The same process may apply in reverse and STB 100 may, for example, digitize and compress pictures from a camera for upstream transmission.

A memory 155 of STB 100 may comprise a dynamic random access memory (DRAM) 160 and a flash memory 165 for storing executable programs and related data components of various applications and modules for execution by STB 100. Both flash memory 165 and DRAM memory 160 may be coupled to processor 125 for storing configuration data and operational parameters, such as commands that are recognized by processor 125.

Basic functionality of STB 100 may be provided by an operating system 170 contained in flash memory 165. Programmed software applications, herein referred to as applications, may be executed by utilizing the computing resources in STB 100. Applications stored in flash memory 165 and/or DRAM memory 160 may be executed by processor 125 (e.g., a central processing unit or digital signal processor) under the auspices of operating system 170. Data required as input by the application program may be stored in DRAM memory 160 and read by processor 125 from DRAM memory 160 as needed during the course of application program execution. Input data may be data stored in DRAM memory 160 by a secondary application or other source, either internal or external to STB 100, or possibly anticipated by the application and thus created with the application program at the time it was generated as a software application program, in which case it may be stored in flash memory 165. Data may be received via any of the communication ports of STB 100, from headend 115 via communication interface 110 (i.e., the QAM or out-of-band tuners) or as user input via receiver 140. A type of input data fulfills and serves the purpose of parameters as described below. Data generated by application program is stored in DRAM memory 160 by the processor 125 during the course of application program execution.

Operating system 170 may comprise a resource manager 172 and a bootloader 174. Resource manager 172 may be operative to allocate and/or control resources, such as memory and processor cycles, of STB 100. Bootloader 174 may comprise instructions for initializing and activating hardware components and software applications and elements of STB 100 at start-up.

Flash memory 165 may also comprise a platform library 175. Platform library 175 may comprise a collection of functionality useful to applications, such as a timer manager, compression manager (for compressing text, video and/or audio), database manager, string managers, and other utilities (not shown). These utilities may be accessed by applications as necessary so that each application does not have to contain these utilities thus resulting in memory consumption savings and a consistent user interface.

A service client 176 may provide a model in which the user may access services available on CTS 100. A service may comprise an application to run and a parameter, such as data content, specific to that service. Service client 180 may handle the lifecycle of the applications on the system, including the definition, initiation, activation, suspension and deletion of services they provide and the downloading of the application into STB 100 as necessary. Many services can be defined using the same application component, with different parameters. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID. Service client 180 may also interface with resource manager 172.

An application client is the portion of an application that executes on STB 100 and provides the application's services to the user typically through a graphical user interface. Also contained in flash memory 165 is a navigator application 177 that may provide a navigation framework for the user to access services available on the cable system. Examples of the services include, in one implementation, watching television and pay-per-view events, listening to digital music, and an interactive bi-directional service program guide, each of which is controlled through separate applications in flash memory 165. Navigator 177 may allow users to access various settings of STB 100, including volume, parental control and VCR commands. Moreover, navigator 177 may provide users with television related menu options that correspond to STT functions such as interactive program guides, channel blocking and/or displaying a content purchase list.

A traditional interactive program guide, IPG 178, and pay-per-view (PPV) are examples of resident applications in flash memory 165. IPG 178 may display a program guide to the user and populates the guide with program data for selection. IPG 178 may enable a user to simply "watch television" while PPV enables viewing of premium television services. These applications, because they are in flash memory 165, may always be available to the user and do not need to be downloaded each time STB 100 initializes.

The applications that are stored in DRAM 160 may be applications that are loaded when STB 100 initializes or are applications that are downloaded to STB 100 upon a user-initiated command using an input device such as remote 150. In a non-limiting example, DRAM memory 160 may contain the following application clients (hereinafter referred to as "application(s)"): a video-on-demand application (VOD) 180, an e-mail application and a digital music application. Additionally, DRAM memory 160 may comprise a calendar and/or a calculator application.

The applications discussed above and other applications provided by a cable system operator may comprise top level software entities on the network for providing services to the user. In one implementation, all applications executing on STB 100 may work with navigator 177 by abiding by several guidelines. For example, an application may first utilize and implement service client 176 for provisioning, activation, and suspension of services. Second, an application may share resources of STB 100 with other applications and abide by the resource management policies of service client 176, operating system 170, and STB 100. Third, an application may handle situations where resources are unavailable without navigator 177 intervention. Fourth, when an application loses service authorization while providing a service, an application may suspend the service gracefully. Navigator 177 will reactivate an individual service application when it later becomes authorized. Finally, an application may be configured so it does not respond to input commands reserved for the navigator. For instance, as a non-limiting example, when user input commands are entered via remote control device 150 or a keyboard, the application may be configured so it does not have access to certain user input keys that are reserved by navigator 177 (e.g., power, channel +/−, volume +/−, etc.). Without limitation to the foregoing, in some circumstances certain applications during the course of program execution may reach a machine-state in which input keys that would ordinarily be reserved may be employed for input by the application but only during that particular machine-state. For example, an application may display a user interface that specifically requests input or selection from the user in which one or more of the reserved keys are used momentarily during that machine-state.

DRAM memory 160 may further comprise a bi-directional services program guide (BSPG) client 182. BSPG client 182 may be downloaded into DRAM 160 from headend 115. Consistent with embodiments of the invention, BSPG client 182 may be resident in flash memory 165. BSPG client 182 may employs a BSPG database 218 of records that comprises of information pertaining to bi-directional communication services for presentation to a subscriber.

A bi-directional communication service may be rendered as a session-based service effected by headend 115. Among other things, session-based bi-directional communication services may include services that are purchasable by a subscriber on an individualized basis for a period of time. A purchasable bi-directional communication service may comprise a vendor that communicates remotely with the purchaser over the period of time for which the service is purchased. Particular vendors may offer the flexibility to purchase their respective services for any from a plurality of time durations, reflecting higher pricing for longer periods. Other purchasable bi-directional communication services, such as a person-to-person bi-directional audiovisual phone session, may not involve a vendor at the remote location.

BSPG database 218 may comprise sufficient information for the presentation of available bi-directional communication services at the current time and for subsequent periods. A BSPG application server (located, for example, at headend 115 and/or a content provider site) in communication with BSPG client 182 may effect updates to BSPG database 218 stored in memory 160 or in a storage device connected internally or externally to STB 100 via a data communication port such as a USB (Universal Serial Bus) or IEEE-1394.

Consistent with embodiments of the invention, bootloader 174 may execute instructions to load the application elements into active memory as part of a startup of STB 100. The bootloader may perform a cyclic redundancy check (CRC) of each element as part of the loading process. A CRC may comprise a hash function that calculates a short, fixed length sequence (e.g. a checksum) for each storage block of data associated with the element. The CRC checksum for each element may be stored, in flash memory 165 for example, and may be recalculated at each boot-up of STB 100.

Bootloader 174 may use the CRC checksum to detect changes to the application elements. For example, if a new version of the element is downloaded to STB 100, the checksum may be different. For another example, a newly downloaded element may not have a stored checksum, allowing bootloader 174 to detect that the element is a new one. Thus, software associated with STB 100 that downloads and stores new elements does not need to participate in the detection of new elements.

Bootloader 174 may also store a current state for each element in flash memory 165. States may comprise, for example, under trial, deemed good, and/or deemed bad.

Once bootloader 174 detects that a new and/or modified element is present, the stored state may be set to 'trial' before the element is initialized. When bootloader 174 loads the element to an appropriate subsystem, such as a security element loading into a security subsystem or process, it may trigger a reboot if the element experiences a fault or it is deemed bad by the security subsystem. Bootloader may continue execution of the element if the data is good and may update the stored state accordingly.

If the element is deemed bad, bootloader 174 may discover this after the reboot by noticing the 'trial' state for the element. Bootloader 174 may allow for more than one try of the new element to mitigate against false-triggers caused by coincidental faults such as power failures or user intervention. If the new element continues to trigger reboots, bootloader 174 may flag it as 'bad' and cease to use the element until the CRC checksum changes. If the material is good, bootloader 174 may survive the first use of the new element and may then store the 'good' state in storage and then will use the element in the future without the need for any trials unless the CRC checksum changes.

For example, an element may comprise a signed key certificate used to authenticate other application images, such as a firmware upgrade image of operating system 170. A secure processor may use externally stored code to initialize by loading an application image before processor 125 is released from a reboot state. Bootloader 174 may pass an update image to the secure processor to load. This update image may be signed by with the key certificate.

Some subscribers may use the secure processor to designate different audio/video code to run on different STBs. For example, different key certificates may authorize the use of different audio/video code. Some subscribers may also have the secure processor updated to fix security holes, update for new features, and/or to support a different cable distribution system and/or network.

The key certificate and secure processor update image may be loaded by bootloader 174 early in the boot process with no way to verify compatibility. If the secure processor objects to the provided data, it may reboots STB 100 as a security defense against brute-force attacks.

Incompatible elements may be loaded on the device by mistake, such as loading a development version of the element on a production set-top box or loading an element designed for a different processor. Other applications on STB 100 may also download updates to the secure processor code and key certificate and store them in flash memory 165 for use on the next boot. The intent may be to allow for security patches and feature upgrades. Consistent with embodiments of the invention, the bootloader may thus leverage the CRC checksum of each element to discover untried elements to allow for proper tracking via persistent storage in flash memory 165. A similar process may be applied to newly attached and/or updated hardware elements by maintaining a similar checksum and state store in flash memory 165.

Figure 2:
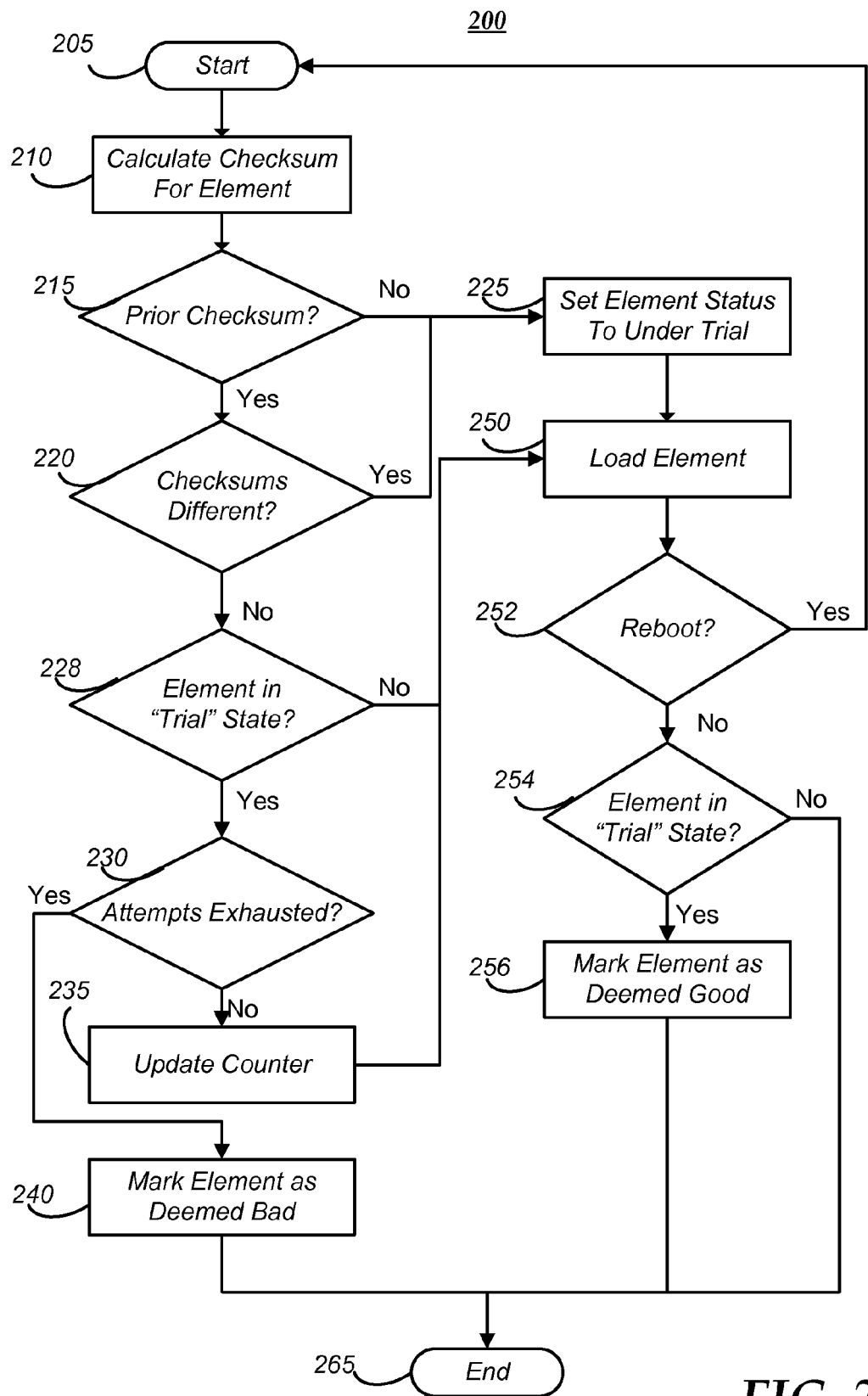
FIG. 2 is a flow chart of a method for providing field-updated security element resilience.

FIG. 2 is a flow chart setting forth the general stages involved in a method 200 consistent with an embodiment of the invention for providing user terminal resiliency against field-updated elements. Method 200 may be implemented using computing device 300 as described in more detail below with respect to FIG. 3. Ways to implement the stages of method 200 will be described in greater detail below. Method 200 may begin at starting block 205 and proceed to stage 210 where computing device 300 may calculate a checksum for an element to be loaded. For example, bootloader 174 of STB 100 may need to load a plurality of application elements into memory as part of STB 100's initialization process. For each element, STB 100 may compute a cyclic redundancy check (CRC) checksum on the element's data.

From stage 210, method 200 may advance to stage 215 where computing device 300 may determine whether a checksum has previously been calculated for the element to be loaded. For example, STB 100 may maintain an element list in persistent memory 155 comprising a status of each element (e.g., "under trial", "deemed good", and/or "deemed bad") and/or at least one previously calculated CRC checksum.

If, at stage 215, computing device 300 determines that a previous checksum exists for the element, method 200 may advance to stage 220 where computing device 300 may determine whether the checksums are different. For example, a different checksum for the element may indicate that a new version of the element is now present.

After determining that the checksums differ at stage 220, or if no prior checksum is found at stage 215, method 200 may advance to stage 225 where computing device 300 may set the element's status to "under trial." For example, if no checksum exists in the element list, a new entry for the element may be created in persistent memory. The new entry may be associated with the CRC checksum calculated at stage 210 and the "under trial" status. As part of setting the element's status to under trial, the stored checksum for the element may be updated and a counter may be initialized for the element. For example, the counter may comprise a countdown style counter, wherein the counter value is set to a number of attempts that may be made before the element is set to the "deemed bad" state and is decremented for each attempt. For another example, a threshold number of attempts may be set, and the counter may be initialized at 0 to be incremented for each attempt to load the element.

If the checksums are not determined to be different at stage 220, method 200 may advance to stage 228 where computing device 300 may determine whether the element is currently in a "trial" state. For example, STB 100 may have previously determined that an element is new and/or changed and set the element's status to "under trial", even though the checksums are now the same.

If, at stage 228, the element is determined to already be in a trial state, method 200 may advance to stage 230 where computing device 300 may determine whether the allowable attempts to load the element have been exhausted. For example, STB 100 may determine whether a countdown style counter has reached 0 and/or if a threshold style counter has reached a maximum number of attempts.

If the attempts have not been exhausted, method 200 may advance to stage 235 where computing device 300 may update the counter associated with the element. For example, a countdown counter may be decremented while a threshold counter may be incremented.

If, at stage 230, computing device 300 determines that the number of allowable attempts has been exhausted, that is, too many reboots have been triggered, method 200 may advance to stage 240 where computing device 300 may set the element's status to "deemed bad". The element's status may be updated to the "deemed bad" state. Elements with a status of "deemed bad" may be skipped on future reboots until a checksum change, as determined at stage 220, indicates that the element has been changed. Method 200 may then end at stage 265.

Method 200 may advance to stage 250 where computing device 300 may attempt to load the element. Stage 250 may be reached if the element is not determined to be in a "trial" status at stage 228, if the element's trial status has just been set in stage 225, or after the element's trial counter has been updated at stage 235. For example, bootloader 174 may load the element into memory 155 and/or allow software code associated with the element to execute on STB 100. Consistent with embodiments of the invention, STB 100 may determine whether the element is in a "deemed bad" status. If so, STB 100 may skip loading of the element and return to stage 210, if any further elements are to be loaded, or end at stage 265 if no further elements are to be loaded.

Method 200 may advance from stage 250 to stage 252; if a reboot occurs during the loading of the element, method 200 may return to stage 205 and restart. Otherwise, method 200 may advance to stage 254 where computing device 300 may determine whether the element is currently in the "trial" state. For example, an incompatible element may cause STB 100 to reboot in order to unload the element from memory 155. For another example, an element to be loaded may comprise an updated version of an existing element that may be associated with a security certificate. STB 100 may attempt to validate the security certificate and determine that the certificate is invalid and/or that the element is incompatible. STB 100 may trigger a reboot under these conditions, such as to defend against a possible security attack.

If the element is determined to be in a "trial" status at stage 254, method 200 may advance to stage 256 where computing device 300 may set the element's status to "deemed good". For example, STB 100 may have loaded the element with no problems. The element may be identified as good for future restarts of STB 100 until a checksum change, as determined at stage 220, indicates that the element has been changed. After updating the status of the element at stage 256, or if no status update was determined to be required because the element was not in a trial status at stage 254, method 200 may end at stage 265.

Figure 3:
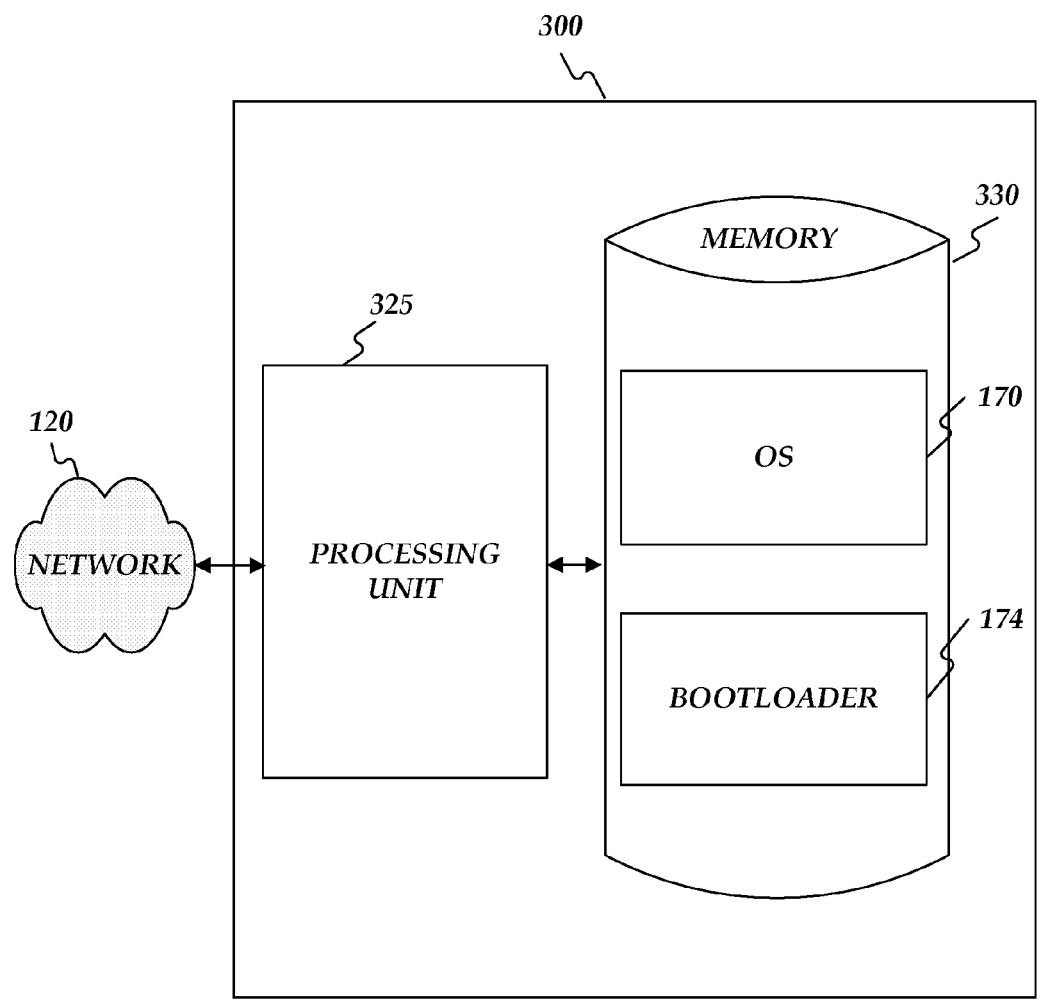
FIG. 3 is a block diagram of a computing device.

FIG. 3 illustrates a computing device 300 as configured to operate as STB 100. Computing device 300 may include a processing unit 310 and a memory unit 320. Memory 320 may comprise, for example, OS 170 and/or bootloader 174. While executing on processing unit 310, OS 170 and/or bootloader 174 may perform processes for providing embodiments of the invention as described above.

Computing device 300 may be implemented using a personal computer, a network computer, a server, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

An embodiment consistent with the invention may comprise a system for providing user terminal resilience. The system may comprise a memory storage and a processing unit coupled to the memory storage. The processing unit may be operative to initialize a user terminal, detect an element associated with the user terminal, determine whether the element is faulty (e.g., triggers a reboot of the user terminal on initializing), and, if so, disable the element. The element may comprise, for example a boot image, an application, software, hardware, and/or security element associated with and/or installed on the user terminal. The processing unit may be further operative to determine whether the element comprises a newly added element and, in response to determining that the element comprises the newly added element, create a state record associated with the newly added element, wherein the state record identifies the newly added element as under trial. If the newly added element is determined to be faulty, the processing unit may be operative to update the state record associated with the newly added element to identify the newly added element as deemed bad; if the newly added element is determined not to be faulty, the processing unit may be operative to update the state record associated with the newly added element to identify the newly added element as deemed good. The determination of whether the element is faulty may, consistent with embodiments of the invention, be made according to whether a security certificate associated with the element is valid.

Another embodiment consistent with the invention may comprise a system for providing user terminal resilience. The system may comprise a memory storage and a processing unit coupled to the memory storage. The processing unit may be operative to determine whether at least one element in a user terminal comprises a new element, and if so, set a status associated with the new element to under trial, load the new element into the memory, determine whether loading the new element into the memory triggers a reboot of the system, and in response to determining that loading the new element into the memory triggers a reboot of the system, set the status associated with the new element to deemed bad. Being operative to determine whether the at least one of the plurality of elements comprises a new element may comprise the processing unit being operative to determine whether the at least one of the plurality of elements comprises a new version of a previously loaded element and/or being operative to determine whether a checksum has previously been calculated for the at least one of the plurality of elements. The new element may trigger the reboot if, for example, the element comprises corrupted data and/or an incompatible element. The processing unit may be further operative to, in response to determining that loading the new element into the memory triggers a reboot of the system, set the status associated with the new element to deemed good. The new element may comprise a security element downloaded via a cable television network.

Yet another embodiment consistent with the invention may comprise a system for providing user terminal resilience. The system may comprise a memory storage and a processing unit coupled to the memory storage. The processing unit may be operative to calculate a cyclic redundancy check (CRC) checksum for at least one first element of a plurality of application elements to be loaded into a memory of a user terminal, determine whether a previous CRC checksum has been calculated for the at least one first element of the plurality of application elements, in response to determining that the previous CRC checksum has not been calculated for the at least one first element of the plurality of application elements, set a status associated with the at least one first element to under trial, in response to determining that the previous CRC checksum has been calculated for the at least one first element of the plurality of application elements, determine whether the previous CRC checksum differs from the calculated CRC checksum for the at least one first element, and, in response to determining that the previous CRC checksum differs from the calculated CRC checksum for the at least one first element, set a status associated with the at least one first element to under trial. The processing unit may be further operative to load the at least one first element into the memory, determine whether initializing the at least one first element triggers a reboot of the user terminal, in response to determining that initializing the at least one first element triggers a reboot of the user terminal, set the status associated with the at least one first element to deemed bad, and skip the loading of the at least one first element into the memory. The processing unit may be further operative to, in response to determining that initializing the at least one first element triggers a reboot of the user terminal, report an error to a provider of the at least one first element via the network and/or attempt to re-download the element.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing user terminal resilience, the method comprising:
   initializing a user terminal;
   detecting an element associated with the user terminal;
   determining whether the element comprises a newly added element, wherein determining the element as the newly added element comprises determining whether a cyclic redundancy check (CRC) checksum has previously been calculated for the element, and wherein the element is marked as the newly created element if there is no previous CRC checksum for the element;

in response to determining that the element comprises the newly added element:
creating a state record, in a persistent memory on the user terminal, for the newly added element, wherein the state record identifies the newly added element as one of: under trial, deemed good, and deemed bad;
marking the newly added element as under trial in the state record; and
initializing a counter associated with the element to a maximum number of predetermined allowable load attempts; and
in response to determining that the element is not a newly added element:
checking the state record of the element to determine the state of the element,
if the state record of the element is under trial, determining whether the counter for the allowable load attempts has expired,
if the counter for the allowable load attempts has not expired, incrementing the counter value, and
if the counter for the allowable load attempts has expired, marking the element in the state record as deemed bad, wherein the element with the state record as deemed bad is skipped on future reboots until the CRC checksum of the element is updated.

2. The method of claim 1, wherein the element comprises an executable software image.

3. The method of claim 1, wherein determining whether the element is faulty comprises determining whether loading the element triggers a reboot of the user terminal.

4. The method of claim 3, further comprising:
in response to determining that loading the element triggers the reboot of the user terminal, updating the state record associated with the newly added element to identify the newly added element as deemed bad.

5. The method of claim 3, further comprising:
in response to determining that loading the element does not trigger the reboot of the user terminal, updating the state record associated with the newly added element to identify the newly added element as deemed good.

6. The method of claim 1, wherein determining whether the element is faulty comprises determining whether a security certificate associated with the element is valid.

7. A system for providing user terminal resilience, the system comprising:
a memory; and
a processor coupled to the memory, wherein the processor is operative to:
determine, for each of a plurality of elements, whether at least one of the plurality of elements comprises a new element, wherein determining that the at least one of the plurality of elements as the new element comprises determining whether a cyclic redundancy check (CRC) checksum has previously been calculated for the at least one of the plurality of elements, and wherein the at least one of the plurality of elements is marked as the new element if there is no previous CRC checksum for the element; and
in response to determining that the at least one of the plurality of elements comprises a new element:
create a state record, in a persistent memory on the user terminal, for the new element, wherein the state record identifies the new element as one of: under trial, deemed good, and deemed bad,
set the status associated with the new element to under trial,
initialize a counter associated with the new element to a maximum number of allowable load attempts,
load the new element into the memory,
determine whether loading the new element into the memory triggers a reboot of the system, and
in response to determining that loading the new element into the memory triggers a reboot of the system:
decrement the counter associated with the new element;
determine whether the decremented counter associated with the new element has reached zero; and
in response to determining that the decremented counter associated with the new element has reached zero, set the status associated with the new element to deemed bad, wherein the element with the state record as deemed bad is not loaded in memory on future reboots until the CRC checksum of the element is updated.

8. The system of claim 7, wherein being operative to determine whether the at least one of the plurality of elements comprises a new element comprises being operative to determine whether the at least one of the plurality of elements comprises a new version of a previously loaded element.

9. The system of claim 7, wherein being operative to determine whether the at least one of the plurality of elements comprises a new element comprises being operative to determine whether a checksum has previously been calculated for the at least one of the plurality of elements.

10. The system of claim 7, wherein being operative to determine loading the new element into the memory triggers a reboot comprises determining whether the new element comprises corrupted data.

11. The system of claim 7, wherein being operative to determine loading the new element into the memory triggers a reboot comprises determining whether the new element comprises an incompatible element.

12. The system of claim 7, wherein the processing unit is further operative to, in response to determining that loading the new element into the memory does not trigger a reboot of the system, set the status associated with the new element to deemed good.

13. The system of claim 7, wherein the new element comprises a security element downloaded via a cable television network.

14. A method for providing user terminal resiliency, the method comprising:
calculating a cyclic redundancy check (CRC) checksum for at least one first element of a plurality of application elements to be loaded into a memory of a user terminal;
determining whether a previous CRC checksum has been calculated for the at least one first element of the plurality of application elements;
in response to determining that the previous CRC checksum has not been calculated for the at least one first element of the plurality of application elements:
creating a state record, in a persistent memory on the user terminal, for the at least one first element, wherein the state record identifies the a status associated with the at least one first element as one of: under trial, deemed good, and deemed bad,
setting the status associated with the at least one first element to under trial, and
initializing a counter associated with the at least one first element to a maximum number of allowable load attempts;

in response to determining that the previous CRC checksum has been calculated for the at least one first element of the plurality of application elements, determining whether the previous CRC checksum differs from the calculated CRC checksum for the at least one first element;

in response to determining that the previous CRC checksum differs from the calculated CRC checksum for the at least one first element:
- creating a state record, in a persistent memory on the user terminal, for the at least one first element, wherein the state record identifies the a status associated with the at least one first element as one of: under trial, deemed good, and deemed bad,
- setting a status associated with the at least one first element to under trial, and
- initializing a counter associated with the at least one first element to a maximum number of allowable load attempts;

loading the at least one first element into the memory;

determining whether initializing the at least one first element triggers a reboot of the user terminal; and in response to determining that initializing the at least one first element triggers a reboot of the user terminal:
- decrementing the counter associated with the at least one element,
- determine whether the decremented counter associated with the at least one element has reached zero, and
- in response to determining that the decremented counter associated with the new element has reached zero:
  - setting the status associated with the at least one first element to deemed bad, wherein the element with the state record as deemed bad is skipped on future reboots until the CRC checksum of the element is updated.

15. The method of claim 14, wherein the at least one first element comprises a security element downloaded to the user terminal via a network.

16. The method of claim 15, further comprising:
in response to determining that initializing the at least one first element triggers a reboot of the user terminal, reporting an error to a provider of the at least one first element via the network.

17. The method of claim 15, further comprising:
in response to determining that initializing the at least one first element triggers a reboot of the user terminal, attempting to re-download the at least one first element.

18. The method of claim 14, further comprising:
in response to determining that initializing the at least one first element does not trigger a reboot of the user terminal, setting the status associated with the at least one first element to deemed good.

* * * * *